United States Patent
Han et al.

(10) Patent No.: US 8,306,115 B2
(45) Date of Patent: Nov. 6, 2012

(54) METHOD AND APPARATUS FOR ENCODING AND DECODING IMAGE

(75) Inventors: Woo-jin Han, Suwon-si (KR); Duck-yeon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 12/396,582

(22) Filed: Mar. 3, 2009

(65) Prior Publication Data

US 2009/0225833 A1 Sep. 10, 2009

(30) Foreign Application Priority Data

Mar. 4, 2008 (KR) .................. 10-2008-0020070

(51) Int. Cl.
*H04B 1/66* (2006.01)
*H04N 7/12* (2006.01)

(52) U.S. Cl. ............................ 375/240.12; 348/403.1

(58) Field of Classification Search .................. 348/568, 348/556, 558, 426, 390, 465, 413, 420, 699, 348/408, 437, 438, 399, 553, 400, 564, 416, 348/384, 402, 415; 382/238, 232, 250, 403.1; 375/240.26, 240.12, 240.15, 240.18, 240.2, 375/240.01, 240.24, 240.16
See application file for complete search history.

(56) References Cited

U.S. PATENT DOCUMENTS

| | | | | |
|---|---|---|---|---|
| 5,191,446 A | * | 3/1993 | Hamano et al. | 358/463 |
| 5,818,531 A | * | 10/1998 | Yamaguchi et al. | 375/240.2 |
| 7,372,904 B2 | * | 5/2008 | Jiang et al. | 375/240.02 |
| 2002/0136308 A1 | * | 9/2002 | Le Maguet et al. | 375/240.25 |
| 2004/0252768 A1 | * | 12/2004 | Suzuki et al. | 375/240.24 |
| 2006/0209960 A1 | * | 9/2006 | Katayama et al. | 375/240.16 |
| 2006/0277040 A1 | | 12/2006 | Sung et al. | |
| 2007/0171944 A1 | | 7/2007 | Schuijers et al. | |
| 2008/0198926 A1 | * | 8/2008 | Bordes et al. | 375/240.03 |
| 2009/0238283 A1 | * | 9/2009 | Han | 375/240.16 |
| 2010/0284467 A1 | * | 11/2010 | Sekiguchi et al. | 375/240.16 |

FOREIGN PATENT DOCUMENTS

| | | |
|---|---|---|
| EP | 1564997 A1 | 8/2005 |
| KR | 10-0541653 A | 12/2005 |
| KR | 10-2006-0109246 A | 10/2006 |
| KR | 10-2006-0119736 A | 11/2006 |
| KR | 10-2006-0124568 A | 12/2006 |
| KR | 10-2007-0001207 A | 1/2007 |

OTHER PUBLICATIONS

Search Report dated Aug. 28, 2009 issued by the International Searching Authroity.

(Continued)

*Primary Examiner* — Behrooz Senfi
(74) *Attorney, Agent, or Firm* — Sughrue Mion, PLLC (57) ABSTRACT

Provided are a method and apparatus for encoding an image capable of improving compression efficiency of the image by compensating for a loss due to quantization of a residual block in the frequency domain, and a method and apparatus for decoding the image. The method of encoding an image includes: generating a prediction macro block for a current macro block; generating a first residual block which is a difference between the prediction macro block and the current macro block; generating a compensation residual block by compensating for a quantization loss of the first residual block in the frequency domain; compensating for the prediction macro block by adding the compensation residual block and the prediction macro block.

21 Claims, 5 Drawing Sheets

OTHER PUBLICATIONS

Communication issued Aug. 9, 2012 by the European Patent Office in counterpart European Application No. 09716747.2.

Tang, Qiang et al. "An Efficient Re-quantization Error Compensation for MPEG2 to H.264 Transcoding". Signal Processing and Information Technology, Aug. 1, 2006, pp. 530-535, XP 031002486.

Yuan, Lujun et al. "The Fast Close-Loop Video Transcoder with Limited Drifting Error", 2004 IEEE International Symposium on Circuits and Systems, May 23, 2004, pp. III-769- III-772, XP010719378.

* cited by examiner

METHOD AND APPARATUS FOR ENCODING AND DECODING IMAGE

CROSS-REFERENCE TO RELATED PATENT APPLICATION

This application claims priority from Korean Patent Application No. 10-2008-0020070, filed on Mar. 4, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to encoding an image capable of improving compression efficiency of the image by compensating for a loss due to quantization of a residual block in a frequency domain, and decoding the image.

2. Description of the Related Art

In image compression methods such as Moving Picture Experts Group-1 (MPEG-1), MPEG-2, MPEG-4, and H.264/MPEG-4 Advanced Video Coding (AVC), a prediction image is generated with respect to an input image through inter-prediction and intra-prediction. Then, a residual, which is a difference value between the prediction image and the input image, is transformed, quantized and variable length coded, thereby generating a bitstream.

In intra-prediction, a prediction value for a current block to be encoded is calculated using pixel values of pixels that are spatially adjacent to the current block, and a difference between the prediction value and an actual pixel value of the current block is encoded. In inter-prediction, a motion vector is generated by searching for a region that is similar to the current encoded block in at least one reference picture that precedes or follows the current encoded picture and a differential value between a prediction block generated by motion compensation using the generated motion vector and the current block is encoded.

The transformation process is to transform image data into the frequency domain so as to remove redundancies existing in the residual, which is a difference value between the prediction image and the input image. Examples of the transformation include Discrete Cosine Transform (DCT) and Wavelet Transformation.

The quantization process reduces transformed coefficients generated in the transformation process into significant numbers of bits. When the quantization process is applied, the transformed coefficients can be represented using a smaller number of bits and thus compression efficiency of the image increases. However, since the number of bits is reduced by the quantization process, data may be damaged, compared to the original data. All lossy compression techniques include the quantization process and thus, the original data cannot be completely restored. However, compression efficiency of the data can be increased by performing the quantization process.

SUMMARY OF THE INVENTION

The present invention provides a method and apparatus for encoding an image capable of improving compression efficiency of the image by compensating for a quantization loss due to quantization of a residual signal which is a difference value between a prediction image and an input image, and a method and apparatus for decoding the image.

According to an aspect of the present invention, there is provided a method of encoding an image, the method including: generating a prediction macro block for a current macro block; generating a first residual block which is a difference between the prediction macro block and the current macro block; compensating for a quantization loss of the first residual block in a frequency domain and generating a compensation residual block; adding the compensation residual block and the prediction macro block and generating a compensated prediction macro block; and encoding a second residual block which is a difference between the compensated prediction macro block and the current macro block.

According to another aspect of the present invention, there is provided an apparatus for encoding an image, the apparatus including: a prediction unit which generates a prediction macro block for a current macro block; a compensation residual block generation unit which compensates for a quantization loss of a first residual block which is a difference between the prediction macro block and the current macro block and generates a compensation residual block; an adding unit which adds the compensation residual block and the prediction macro block and generates a compensated prediction macro block; and an encoding unit which encodes a second residual block which is a difference between the compensated prediction macro block and the current macro block.

According to another aspect of the present invention, there is provided a method of decoding an image, the method including: extracting a prediction mode of a current macro block that is decoded from an input bitstream and compensation value information used to compensate for a quantization loss of a prediction macro block, the prediction macro block being a prediction value of the current macro block; generating the prediction macro block of the current macro block according to the extracted prediction mode; compensating the prediction macro block by using the extracted compensation value information; and adding the compensated prediction macro block and a residual included in the bitstream and restoring the current macro block.

According to another aspect of the present invention, there is provided an apparatus for decoding an image, the apparatus including: an entropy decoding unit which extracts a prediction mode of a current macro block that is decoded from an input bitstream and compensation value information used to compensate for a quantization loss of a prediction macro block, the prediction macro block being a prediction value of the current macro block; a prediction unit which generates the prediction macro block of the current macro block according to the extracted prediction mode; a compensation unit which compensates the prediction macro block by using the extracted compensation value information; and an adding unit which adds the compensated prediction macro block and a residual included in the bitstream and restores the current macro block.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described more fully with reference to the accompanying drawings.

Figure 1:
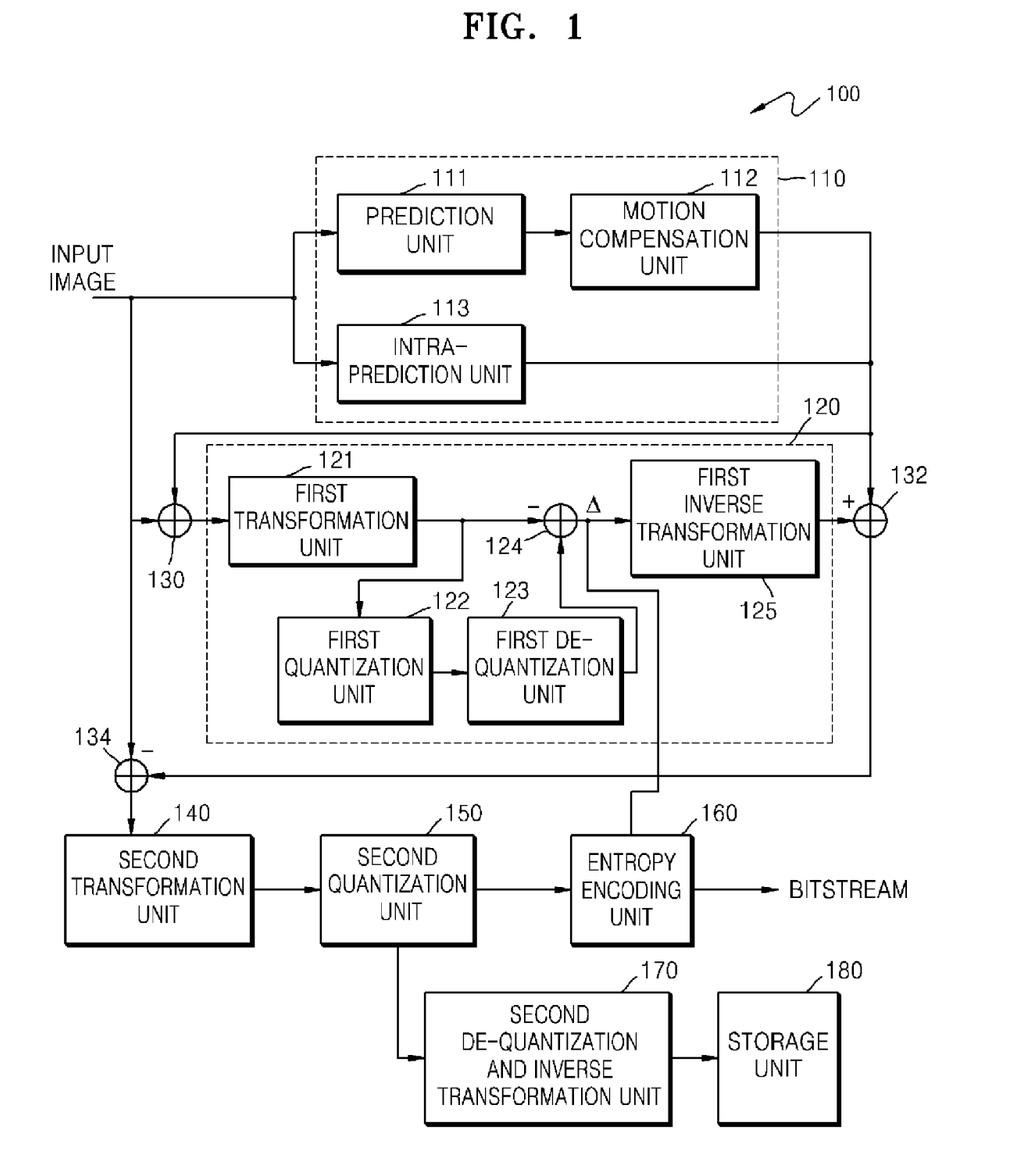
FIG. 1 is a block diagram of an apparatus for encoding an image, according to an exemplary embodiment of the present invention.

FIG. 1 is a block diagram of an apparatus for encoding an image, according to an exemplary embodiment of the present invention.

Referring to FIG. 1, an apparatus for encoding an image 100 includes a prediction unit 110, a compensation residual block generation unit 120, a first subtraction unit 130, a compensation unit 132, a second subtraction unit 134, a second transformation unit 140, a second quantization unit 150, an entropy encoding unit 160, a second de-quantization and inverse transformation unit 170, and a storage unit 180. The prediction unit 110 includes a motion prediction unit 111, a motion compensation unit 112, and an intra-prediction unit 113. The compensation residual block generation unit 120 includes a first transformation unit 121, a first quantization unit 122, a first de-quantization unit 123, a second subtraction unit 124, and a first inverse transformation unit 125.

The prediction unit 110 divides an input image into blocks having a predetermined size and generates prediction blocks through inter-prediction or intra-prediction with respect to each divided block. More specifically, the motion prediction unit 111 performs motion prediction for generating a motion vector which indicates a region that is similar to the current block in a predetermined searching range of a reference picture, the reference picture being previously encoded and then restored. The motion compensation unit 112 performs inter-prediction through a motion compensation process in which region data corresponding to the reference picture indicated by the generated motion vector is obtained and the prediction block of the current block is generated. Here, the inter-prediction and intra-prediction that were used in the conventional image compression standard such as the H.264 standard can be used or various other transformed prediction methods can be applied.

The first subtraction unit 130 calculates the difference values between the current input block and the prediction block generated from the prediction unit 110, thereby generating a first residual block.

The compensation residual block generation unit 120 compensates for a quantization loss of the first residual block in the frequency domain, thereby generating a compensation residual block. In order to calculate the quantization loss, the compensation residual block generation unit 120 calculates the difference between a value that is used to quantize the first residual block and a value that is not used to quantize the first residual block.

More specifically, the first transformation unit 121 transforms the first residual block into the frequency domain in a macro block unit having a size of 16×16. Primary methods for transforming into the frequency domain include Discrete Cosine Transformation (DCT) and Wavelet Transformation. When the prediction is performed in the prediction unit 110 with a sub-block unit that is smaller than the macro block having the size of 16×16, the first transformation unit 121 performs the transformation after the prediction for all sub-blocks included in the macro block is completed. The first quantization unit 122 quantizes the first residual block which is transformed into the frequency domain. More specifically, the first quantization unit 122 performs the quantization by rounding off the value obtained by dividing transformed coefficients of the transformed first residual block by a predetermined quantization step.

The first de-quantization unit 123 multiplies again the transformed coefficients of the quantized first residual block by the quantization step, thereby de-quantizing the transformed and quantized first residual block. The second subtraction unit 124 calculates the difference value Δ between the transformed first residual block output from the first transformation unit 121 and the transformed first residual block output from the first de-quantization unit 123 which respectively perform the quantization and de-quantization. Such a difference value Δ indicates the loss generated by the quantization. The first inverse transformation unit 125 inverse-transforms again the difference value Δ between the first residual block, in which quantization and de-quantization are omitted, that is transformed into the frequency domain, and the transformed first residual block through which the quantization and de-quantization are performed, thereby generating the compensation residual block. The difference value Δ, prior to being transformed by the first inverse transformation unit 125, indicates the compensation residual block in the frequency domain and the difference value Δ, inverse-transformed by the first inverse transformation unit 125, indicates the compensation residual block in the spatial region.

The compensation unit 132 adds the compensation residual block output by the first inverse transformation unit 125 and a prediction macro block output by the motion compensation unit 112, thereby generating a compensated prediction macro block. A third subtraction unit 134 calculates the difference values between the input current macro block and the compensated prediction macro block, thereby generating a second residual block.

The second transformation unit 140 transforms the second residual block output by the third subtraction unit 134 into the frequency domain and generates transformed coefficients. The second quantization unit 150 quantizes the transformed coefficients. Here, as in the related art, the second transformation unit 140 transforms the second residual block with a sub-block unit having a size of 8×8 or 4×4. The entropy encoding unit 160 performs variable-length coding on the quantized transformed coefficients, thereby generating a bitstream. The second de-quantization and inverse transformation unit 170 performs the de-quantization and inverse transformation on the quantized second residual block so as to restore the second residual block by the second quantization unit 150 and adds the restored second residual block and the compensated prediction macro block so as to restore the current macro block. The restored current macro block output by the inverse transformation unit 170 is stored in the storage unit 180 for prediction encoding of a next macro block.

Meanwhile, the entropy encoding unit 160 adds information about the compensation residual block generated from the compensation residual block generation unit 120 to the bitstream. Accordingly, the quantization loss for the prediction macro block is compensated in a decoding apparatus so that the compensated prediction macro block can be restored. Here, the information about the compensation residual block may be information about the compensation residual block output from the first inverse transformation unit 125 in FIG. 1 or information about the compensation residual block in the frequency domain, that is, information about the difference values Δ prior to being inverse transformed by the first inverse transformation unit 125.

Figure 2:
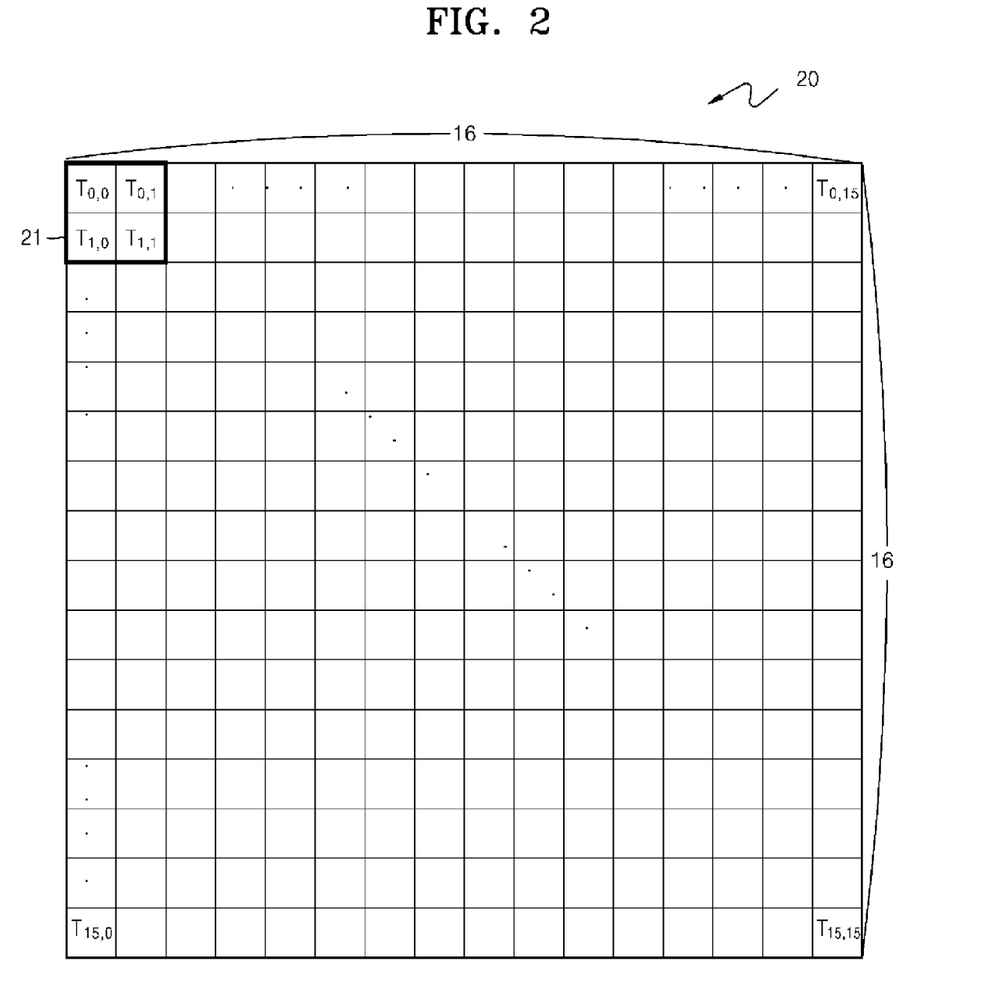
FIG. 2 shows a compensation residual block in the frequency domain.

FIG. 2 shows the compensation residual block in the frequency domain. In FIG. 2, $T_{i,j}$ denotes the transformed coefficient of the compensation residual block located on $i^{th}$ row and $j^{th}$ column, Referring to FIG. 2, the transformed coefficient $T_{0,0}$ at the top left side in the compensation residual block 20 in the frequency domain corresponds to a Direct Current (DC) transformed coefficient indicating average values of the transformed coefficients included in the compensation residual block and the remaining transformed coefficients correspond to Alternating Current (AC) transformed coefficients. As with the information on the compensation residual block, the entropy encoding unit 160 selects only a DC transformed coefficient so as to add the selected DC transformed coefficient to the bitstream or selects only the DC transformed coefficient and a predetermined number of AC transformed coefficients 21 that are adjacent to the DC transformed coefficient from among the transformed coefficients of the compensation residual block so as to add the selected coefficients to the bitstream. Since the transformed coefficients corresponding to high frequency components of the compensation residual block in the frequency domain mostly have values of 0 or values near 0, only DC transformed coefficients and AC transformed coefficients adjacent to the DC transformed coefficient in a low frequency domain having significant values not equal to 0, are transmitted as information about the compensation residual block so that information for efficiently compensating for the quantization loss can be transmitted while allocating a small bit.

In addition, the entropy encoding unit 160 adds predetermined binary information indicating whether the current macro block is encoded using the compensated prediction macro block according to the present invention to header information of the encoded macro block, thereby determining whether it is necessary to compensate the prediction block of the current block in the decoding apparatus. For example, one bit indicating whether to apply the present invention is added to the bit stream. When the value of the added bit is '0', it indicates the macro block encoded according to the related art without compensating for the quantization loss. When the value of the added bit is '1', it indicates that the macro block is compensated by compensating for the quantization loss of the macro block according to the exemplary embodiment the present invention.

Figure 3:
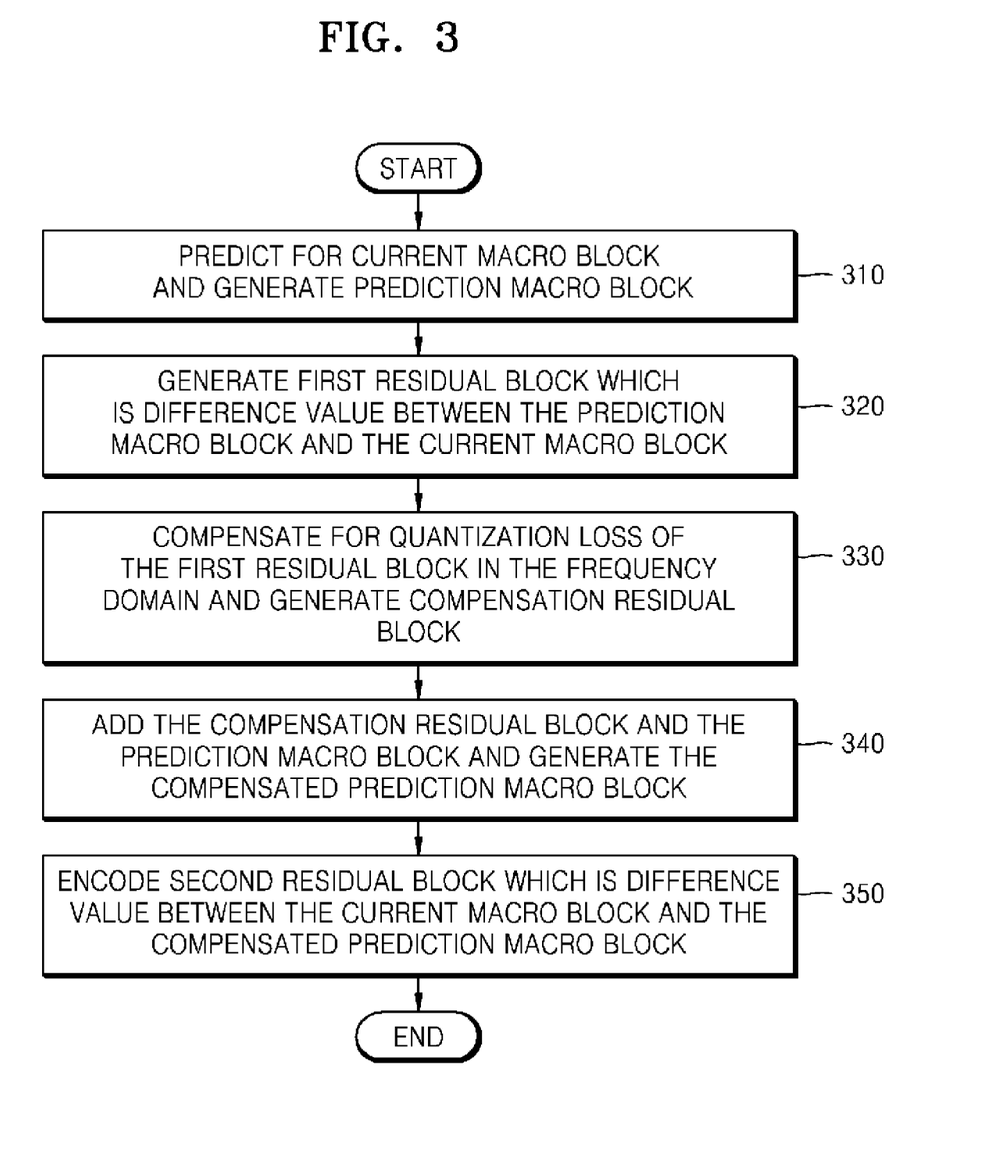
FIG. 3 is a flowchart illustrating a method of encoding an image, according to an exemplary embodiment of the present invention.

FIG. 3 is a flowchart illustrating a method of encoding an image, according to an exemplary embodiment of the present invention.

Referring to FIG. 3, intra-prediction or inter-prediction for the current macro block is performed to generate the prediction macro block, in operation 310.

In operation 320, the difference value between the prediction macro block and the current macro block is calculated to generate the first residual block.

In operation 330, the quantization loss of the first residual block is compensated for in the frequency domain to generate the compensation residual block. More specifically, as described above, the difference values between the first transformed residual block generated by transforming the first residual block into the frequency domain and the second transformed residual block generated by quantizing and de-quantizing the first transformed residual block is calculated and the difference values are inverse-transformed to generate the compensation residual block.

In operation 340, the compensation residual block and the prediction macro block are added to each other to generate the compensated prediction macro block.

In operation 350, the difference values between the current macro block and the compensated prediction macro block are calculated to generate the second residual block and the second residual block is transformed, quantized, and entropy encoded to generate the bitstream. Here, in order to compensate the prediction macro block in the decoding apparatus, information on the DC transformed coefficient or the predetermined number of AC transformed coefficients that are adjacent to the DC transformed coefficient from among the transformed coefficients of the compensation residual block in the frequency domain prior to being inverse transformed, may be only added to the bitstream as compensation information of the quantization loss.

Figure 4:
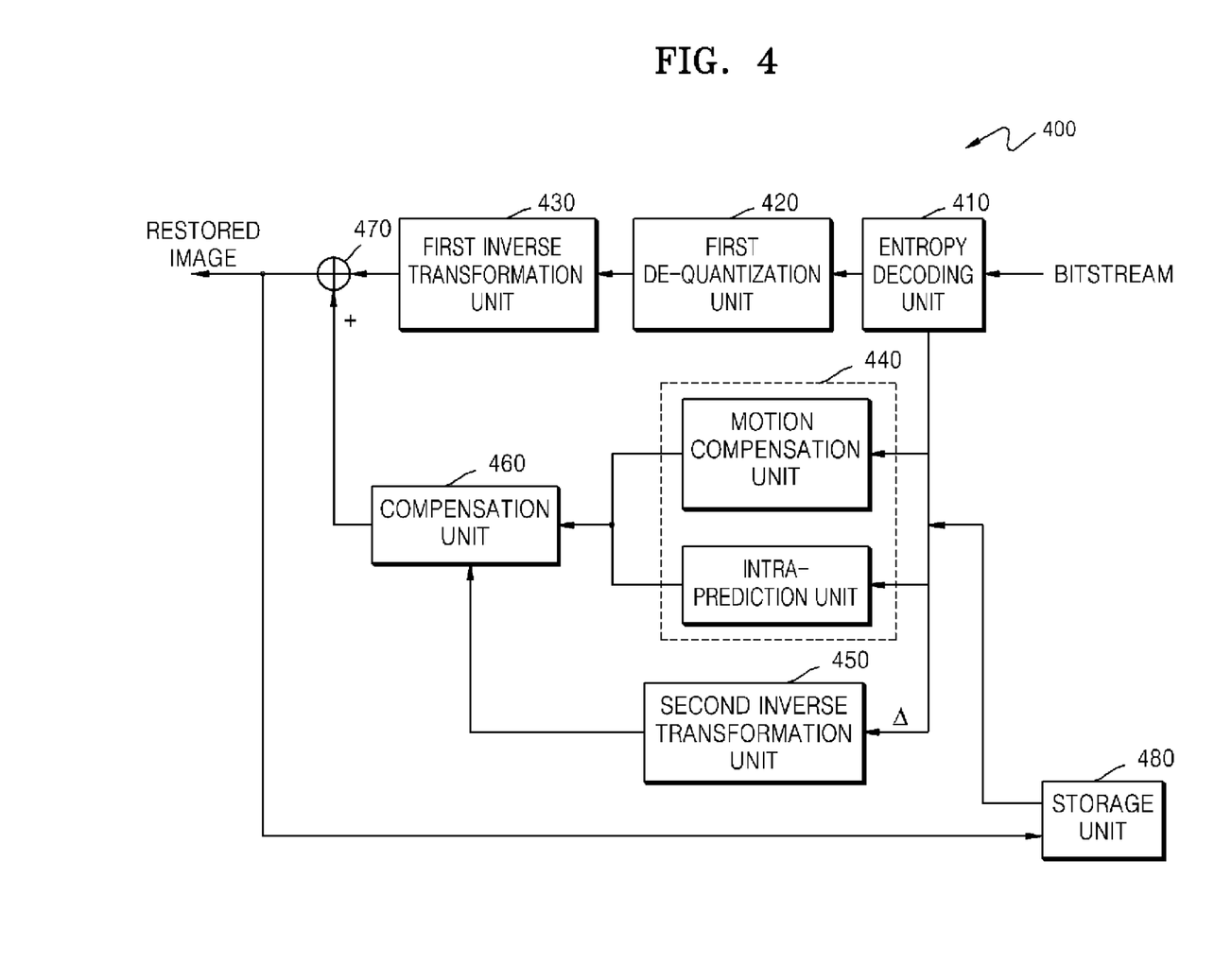
FIG. 4 is a block diagram of an apparatus for decoding an image, according to an exemplary embodiment of the present invention.

FIG. 4 is a block diagram of an apparatus for decoding an image, according to an exemplary embodiment of the present invention.

Referring to FIG. 4, an apparatus for decoding an image 400 includes an entropy decoding unit 410, a first de-quantization unit 420, a first inverse transformation unit 430, a prediction unit 440, a second inverse transformation unit 450, a compensation unit 460, an adding unit 470, and a storage unit 480.

The entropy decoding unit 410 receives a compressed bitstream and performs entropy decoding on the bitstream, thereby extracting a prediction mode of the current block, information on the second residual block, and information on the compensation residual block included in the bitstream.

The first de-quantization unit 420 and the first inverse transformation unit 430 perform quantization and inverse transformation on the second residual block extracted by the entropy decoding unit 410 and thus restore the second residual block.

The prediction unit 440 generates the prediction block for the current macro block according to the prediction mode extracted by the entropy decoding unit 410. For example, the prediction block is generated for the intra predicted block, by using data around the same frame that is previously restored, and the prediction block is generated for the inter-predicted block, by using data in the region corresponding to the reference picture using the motion vector and the reference picture information included in the bitstream.

The second inverse transformation unit 450 inverse transforms the compensation residual block extracted from the bitstream by the entropy decoding unit 410 so as to restore the compensation residual block in the spatial region. As described above, this is because when the transformed coefficients of the compensation residual block in the frequency domain are added to the bitstream and transmitted during encoding, inverse transforming of the compensation residual block information into the spatial region is necessary. When the inverse transformed value is used as the compensation residual block information, the second inverse transformation unit 450 may be omitted.

The compensation unit 460 adds the compensation residual block in the spatial region, that is inverse transformed and restored, and the prediction macro block and generates the prediction macro block in which the quantization loss is compensated for.

The adding unit 470 adds the compensated prediction macro block and the restored second residual block to restore the current macro block. The restored current block is stored in the storage unit 480 and is used in decoding the next macro block.

Figure 5:
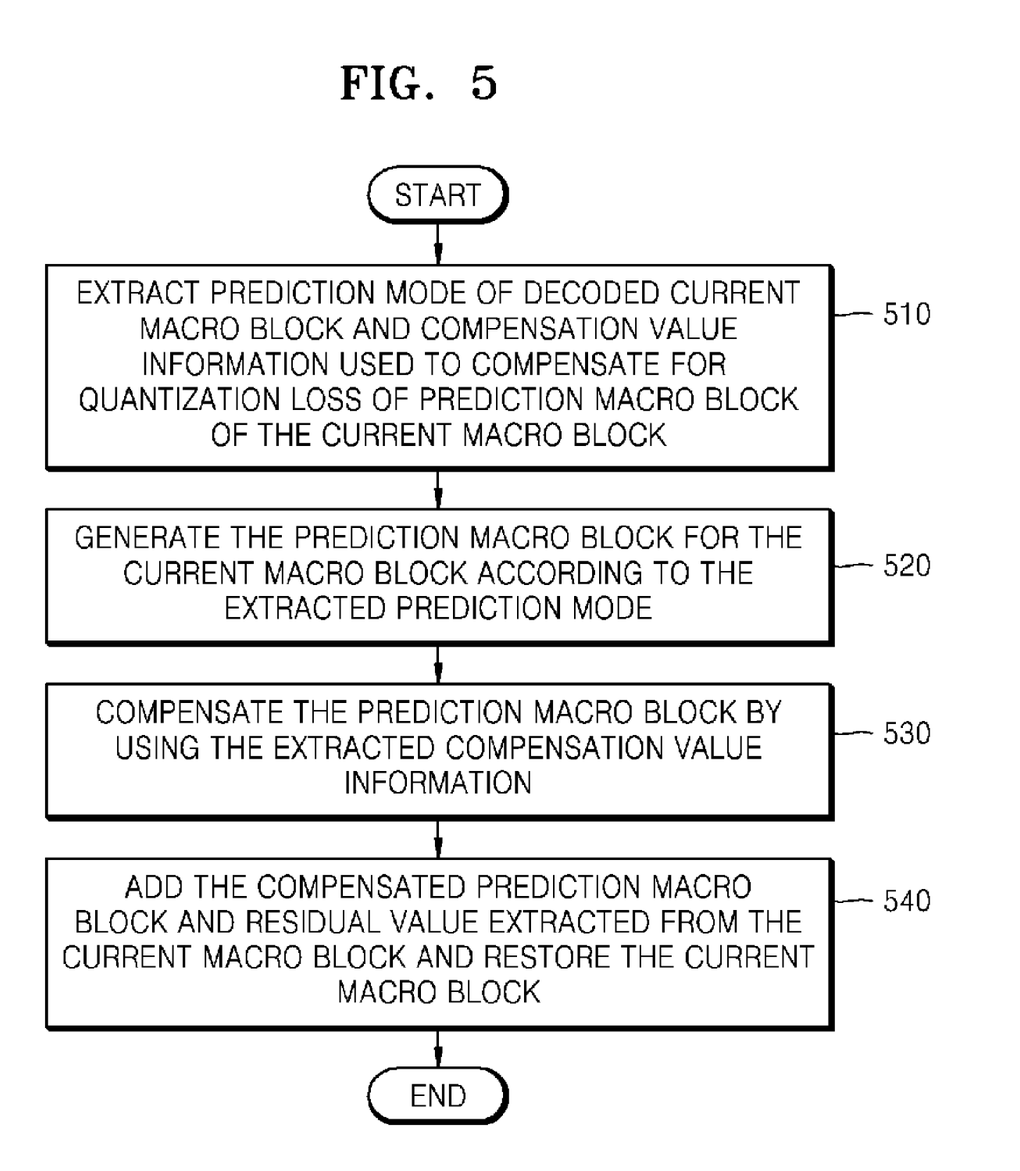
FIG. 5 is a flowchart illustrating a method of decoding an image, according to an exemplary embodiment of the present invention.

FIG. 5 is a flowchart illustrating a method of decoding an image, according to an exemplary embodiment of the present invention.

Referring to FIG. 5, the prediction mode of the decoded current macro block, information on the second residual block, and compensation value information used to compensate for the quantization loss of the prediction macro block are extracted from the input bitstream, in operation 510.

In operation 520, intra-prediction or inter-prediction is performed according to the extracted prediction mode and the prediction macro block for the current macro block is generated.

In operation 530, the prediction macro block is compensated by using the extracted compensation value information. More specifically, the compensation residual block that corresponds to the compensation value information is inverse transformed to generate the compensation residual block in the spatial region. Then, the prediction macro block and the compensation residual block in the spatial region are added to each other to generate the compensated prediction macro block.

In operation 540, the compensated prediction macro block and the second residual block extracted from the bitstream and restored are added to each other to restore the current macro block.

According to the present invention, loss due to quantization of the residual signal is compensated for so that compression efficiency of an image can be improved and the Peak Signal to Noise Ratio (PSNR) of the image can be improved.

The invention can also be embodied as computer readable codes on a computer readable recording medium. The computer readable recording medium is any data storage device that can store data which can be thereafter read by a computer system. Examples of the computer readable recording medium include read-only-memory (ROM), random-access-memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image, the method comprising:
   generating a prediction macro block for a current macro block;
   generating a first residual block which is a difference between the prediction macro block and the current macro block;
   generating a compensation residual block by compensating for a quantization loss of the first residual block in a frequency domain;
   generating a compensated prediction macro block by adding the compensation residual block and the prediction macro block; and
   encoding a second residual block which is a difference between the compensated prediction macro block and the current macro block.

2. The method of claim 1, wherein the generating the compensation residual block comprises:
   generating a first transformed residual block by transforming the first residual block into the frequency domain;
   generating a second transformed residual block by quantizing and de-quantizing the first transformed residual block; and
   generating the compensation residual block by calculating a difference value between the first transformed residual block and the second transformed residual block, and inverse transforming the difference value.

3. The method of claim 1, further comprising adding information about the compensation residual block to a bitstream generated by encoding the second residual block.

4. The method of claim 3, wherein the adding the information about the compensation residual block to the bitstream comprises selecting only a Direct Current (DC) transformed coefficient from among transformed coefficients, which are generated by transforming the compensation residual block into the frequency domain, and adding the selected DC transformed coefficient to the bitstream.

5. The method of claim 3, wherein the adding information on the compensation residual block comprises selecting only a direct current (DC) transformed coefficient and a predetermined number of Alternating Current (AC) transformed coefficients that are adjacent to the DC transformed coefficient from among transformed coefficients, which are generated by transforming the compensation residual block into the frequency domain, and adding the selected DC transformed coefficient and the selected AC transformed coefficients to the bitstream.

6. The method of claim 1, wherein the encoding of the second residual block comprises dividing the second residual block into sub-blocks selected from among sub-blocks having a size of 8×8 and 4×4, and performing transformation, quantization, and entropy encoding on the divided sub-blocks.

7. An apparatus for encoding an image, the apparatus comprising:
   a prediction unit which generates a prediction macro block for a current macro block;
   a compensation residual block generation unit which generates a compensation residual block by compensating for a quantization loss of a first residual block which is a difference between the prediction macro block and the current macro block;
   an adding unit which generates a compensated prediction macro block by adding the compensation residual block and the prediction macro block; and
   an encoding unit which encodes a second residual block which is a difference between the compensated prediction macro block and the current macro block.

8. The apparatus of claim 7, wherein the compensation residual block generation unit comprises:
   a first transformation unit which transforms the first residual block into a frequency domain to generate a first transformed residual block;
   a first quantization and de-quantization unit which quantizes and de-quantizes the first transformed residual block to generate a second transformed residual block; and
   a first inverse transformation unit which inverse transforms a difference value between the first transformed residual block and the second transformed residual block to generate the compensation residual block.

9. The apparatus of claim 7, wherein the encoding unit adds information about the compensation residual block to a bitstream generated by encoding the second residual block.

10. The apparatus of claim 9, wherein the encoding unit selects only a Direct Current (DC) transformed coefficient from among transformed coefficients, which are generated by transforming the compensation residual block into the frequency domain, and adds the selected DC transformed coefficient to the bitstream.

11. The apparatus of claim 9, wherein the encoding unit selects only a Direct Current (DC) transformed coefficient and a predetermined number of Alternative Current (AC) transformed coefficients that are adjacent to the DC transformed coefficient from among transformed coefficients, which are generated by transforming the compensation residual block into the frequency domain, and adds the selected DC transformed coefficient and the selected AC transformed coefficients to the bitstream.

12. A method of decoding an image, the method comprising:
   extracting a prediction mode of a current macro block that is decoded from an input bitstream and compensation value information used to compensate for a quantization loss of a prediction macro block, the prediction macro block being a prediction value of the current macro block;
   generating the prediction macro block of the current macro block according to the extracted prediction mode;
   compensating the prediction macro block based on the extracted compensation value information; and
   adding the compensated prediction macro block and a residual included in the bitstream to restore the current macro block.

13. The method of claim 12, wherein the compensation value information comprises a compensation residual block obtained by transforming difference values between a first transformed residual block generated by transforming a first residual block into a frequency domain and a second transformed residual block generated by quantizing and de-quantizing the first transformed residual block during encoding, the first residual block being a difference between the current macro block and the prediction macro block.

14. The method of claim 13, wherein the compensation value information only comprises a Direct Current (DC) transformed coefficient from transformed coefficients generated by transforming the compensation residual block into the frequency domain.

15. The method of claim 13, wherein the compensation value information only comprises a Direct Current (DC) transformed coefficient and a predetermined number of Alternative Current (AC) transformed coefficients that are adjacent to the DC transformed coefficient from among transformed coefficients generated by transforming the compensation residual block into the frequency domain.

16. The method of claim 12, wherein the compensating the prediction macro block comprises adding the compensation residual block included in the extracted compensation value information to the prediction macro block.

17. An apparatus for decoding an image, the apparatus comprising:
   an entropy decoding unit which extracts a prediction mode of a current macro block that is decoded from an input bitstream and compensation value information used to compensate for a quantization loss of a prediction macro block, the prediction macro block being a prediction value of the current macro block;
   a prediction unit which generates the prediction macro block of the current macro block according to the extracted prediction mode;
   a compensation unit which compensates the prediction macro block based on the extracted compensation value information; and
   an adding unit which adds the compensated prediction macro block and a residual included in the bitstream to restore the current macro block.

18. The apparatus of claim 17, wherein the compensation value information comprises a compensation residual block obtained by inverse transforming difference values between a first transformed residual block generated by transforming a first residual block into a frequency domain and a second transformed residual block generated by quantizing and de-quantizing the first transformed residual block during encoding, the first residual block being a difference between the current macro block and the prediction macro block.

19. The apparatus of claim 18, wherein the compensation value information only comprises a Direct Current (DC) transformed coefficient from among the difference values.

20. The apparatus of claim 18, wherein the compensation value information only comprises a Direct Current (DC) transformed coefficient and a predetermined number of Alternative Current (AC) transformed coefficients that are adjacent to the DC transformed coefficient from among the difference values.

21. The apparatus of claim 17, wherein the compensation unit adds the compensation residual block included in the extracted compensation value information and the prediction macro block.

* * * * *